United States Patent Office

2,935,520
Patented May 3, 1960

2,935,520

RECOVERY OF STEROIDS FROM FERMENTATION BROTH

Peter A. Guercio, New London, Conn., assignor to Chas. Pfizer & Co., Inc., New York, N.Y., a corporation of Delaware No Drawing. Application December 17, 1956
Serial No. 628,525

6 Claims. (Cl. 260—397.45)

This invention is concerned with methods for the recovery of valuable fermentation products. In particular it is concerned with the recovery of certain steroid compounds which are formed in fermentation media.

In recent years a variety of reactions of steroid compounds have been shown to be operable by means of the activity of certain microorganisms. For instance, oxygenation of steroids such as the conversion of compound S to hydrocortisone has been accomplished with a variety of different microorganisms. The conversion of hydrocortisone to prednisolone has also been accomplished with various microorganisms, as has the preparation of various related compounds including also 14,15-epoxidohydrocortisone, 14-hydroxyprednisolone and 14-hydroxyhydrocortisone.

It has now been found that a new process described in detail herein is particularly effective for recovering and purifying compounds of the nature indicated above from fermentation products containing these. In the novel process, the steroid product is extracted from the fermentation broth with a water-immiscible organic solvent, the extract is then purified by extraction with a buffer, preferably of the phosphate type, at a basic pH. The solvent extract is thereafter concentrated to a concentration that is suitable for crystallization of the product considering its solubility in the chosen organic solvent. Further buffer solution is added to the concentrate, and the mixture is cooled and agitated to crystallize the product. There is thereby achieved a crystalline product of a high degree of purity, and this is achieved by a means of a simpler process than has been used heretofore.

The crystalline product may be further purified by recrystallization from a mixture of a water-immiscible halogenated solvent, preferably chloroform, containing a minor proportion of a lower alkanol containing up to three carbon atoms. The addition of water to this mixture forms a two-phase system and precipitates steroid product. A product of very high purity and of satisfactory quality for use in pharmaceutical preparations is thereby obtained.

Remarkably good yields of the product are obtained in this manner. They generally exceed 70% of the desired steroid present in the fermentation broth. Often the products of these fermentations contain more than one steroid material and the present process is successful in achieving an unusual degree of purification from such undesirable contamination with closely related substances.

In a modification of the process described above a steroid solution which is obtained by extraction of a fermentation broth with a halogenated solvent of the type described hereinafter is treated with a minor proportion of a lower alkanol containing up to three carbon atoms, prior to crystallization in the presence of aqueous buffer solution. This appreciably assists in assuring a product of high purity.

Alternatively, if the fermentation broth is extracted in a ketone solvent of the type described hereinafter, the concentrated ketone solution is treated with a large portion of a halogenated solvent of the type to be described hereinafter prior to treatment with an alkanol and crystallization in the presence of aqueous buffer solution. In the usual practice the ketone solution after treatment with a halogenated solvent will contain about 30% ketone by volume.

Fermentation broth is preferably filtered with the use of a diatomaceous earth filteraid at a slightly acidic pH, that is, from about 3 to about 6. Thereafter the product is extracted from the filtered fermentation broth into a suitable solvent.

In the operation of the process described above the preferred water-immiscible solvent used for the initial extraction of the steroid product from the fermentation broth is methyl isobutyl ketone, methyl ethyl ketone, methylene chloride, ethylene chloride or chloroform. The extraction of the product by these solvents may be accomplished by a batchwise procedure, that is, by stirring a volume of solvent with one to five volumes of fermentation broth followed by settling and separation of the phases. This may be repeated several times to assure complete separation. Alternatively, extraction may be accomplished in packed towers where the filtered fermentation broth and the solvent are passed countercurrent to one another through the packed zone. A preferred method involves the use of countercurrent extractors of the Podbielniak type, since a maximum of efficiency in extraction is obtained.

After the solvent extract of the steroid compound is separated from the aqueous phase it is washed with an aqueous solution of a water-soluble buffer such as a mixture of sodium acid phosphates at a pH of from about 7.5 to about 9.0. A volume of the buffer of from about one-third to about twice that of the solvent extract may be used and this is used in the form of a dilute aqueous solution. For instance, a buffer may be prepared by treating a 1% aqueous solution of sodium dihydrogen phosphate with sufficient concentrated sodium hydroxide solution to adjust the pH to the range 8 to 8.5. Other buffers that are useful are alkali metal carbonate and bicarbonate mixtures and alkali metal acetate-acetic acid or alkali metal hydroxide combinations (depending upon the desired pH). In fact, practically any water soluble combination of a strong base and a weak acid adjusted to a suitable pH is satisfactory.

The extraction with buffer may be conducted by a batchwise process or by the countercurrent means described above. The purified solvent extract of steroid compound is then concentrated by distillation of the solvent, preferably under vacuum, to a concentration of about 100 to about 300 mg. of the steroid per ml. of solution. The optimum concentration may vary somewhat with the particular steroid compound that is being recovered. For prednisolone and hydrocortisone a concentration of about 250 mg./ml. is quite satisfactory. If too great a concentration is obtained there may be a tendency for impurities to separate at the time of crystallization.

After concentration, the solvent concentrate is treated with about one-half to two volumes of a buffer of the type described above at a pH of from about 7.5 to 9.0 preferably in the range 8 to 8.5. The mixture which has two phases is then cooled and stirred slowly for several hours. In general, a temperature of 10° C. or less is preferred and a temperature appreciably below 0° C. is not used. After several hours of stirring, that is, from about three to about twenty hours, the crystalline product may be removed from the two-phase liquid system. Removal may be accomplished by filtration, by centrifuging or by other means. The product is separated from the solvent and it is then dried.

Although the product is of high purity its purity may be further increased by crystallization if this is desired. For instance, the product may be dissolved in a mixture of one of the halogenated solvents listed above containing a minor proportion (5 to 35%) of a lower alkanol containing up to three carbon atoms. The preferred solvent is chloroform and the preferred alkanol is methanol. A concentration of from about 30 to about 100 mg. of the crystals per ml. of solvent is used. Thereafter, the recrystallized product may be obtained by the gradual addition to this mixture of water preferably using from about one-half to three volumes of water per volume of solvent. The mixture is agitated and the recrystallized product separates. It may be removed by filtration or by centrifuging and this step may be repeated if further purification is desired.

Additional materials may be recovered by concentration of the mother liquor, that is, the filtrate or centrifugate from the above described purification procedure. This material, however, may be of low purity and it may be desirable to recycle it for further purification.

The following examples are given by way of illustration only and are not to be considered as limitations of this invention, many variations of which are possible without departing from the spirit or scope thereof.

*Example I*

A fermentation broth containing 100 mg. of $\Delta^1$-dehydrohydrocortisone per gallon was prepared by the action of *Mycobacterium smegmatis* on hydrocortisone as described in copending patent application, Serial No. 551,727, filed December 8, 1955. The fermentation broth in addition to the $\Delta^1$-dehydrohydrocortisone also contained the residual hydrocortisone and certain structurally related steroid compounds. The broth was filtered with the aid of a diatomaceous earth filteraid at pH 4.0. It was then extracted with methyl isobutyl ketone in a Podbielniak extractor at a solvent to broth ratio of 1 to 3. The methyl isobutyl ketone extract was washed with one volume of 1% disodium acid phosphate adjusted to pH 8 with concentrated sodium hydroxide. The washed methyl isobutyl ketone solution of the steroid was concentrated by distillation to obtain a solution containing 250 mg. of $\Delta^1$-dehydrohydrocortisone per ml. To the solvent concentrate was added one volume of 1% disodium acid phosphate adjusted to pH 8.5 with sodium hydroxide. The mixture was then cooled to 0° C. and was stirred slowly for ten hours. The crystalline product was then filtered. The crystals were dried under vacuum with the application of slight heat. The dried product was then dissolved in a mixture of 90% by volume of chloroform and 10% by volume of methanol using 50 mg. of the solid per ml. of solvent mixture. The purified product was crystallized by the gradual addition of an equal volume of water using agitation throughout the addition.

*Example II*

A fermentation broth prepared by the growth of *Curvularia lunata* in a fermentation medium as described in U.S. Patent 2,658,023 and containing approximately 200 mg. of hydrocortisone per gallon of broth together with other steroid impurities was filtered at pH 4. The product was then extracted three separate times by the batchwise addition of two volumes of methyl isobutyl ketone. The combined methyl isobutyl ketone extracts were then washed with sodium acid phosphate buffer at pH 8 and the layers separated. The ketone solution was then concentrated to 250 mg. of product per ml. of solution. To the solvent concentrate was added one volume of 1% disodium acid phosphate adjusted to pH 8.0 with sodium hydroxide. The mixture was then cooled to 5° C. and stirred slowly for fifteen hours. Crystalline product was then obtained by filtration.

*Example III*

A fermentation broth prepared by the growth of *Nocardia opaca* in a fermentation medium as described in copending patent application, Serial No. 538,514, filed October 4, 1955, and containing prednisolone at a concentration of approximately 200 mg. per gallon of broth together with other steroid impurities was filtered at pH 4. The product was then extracted in a model 6900 Podbielniak extractor operating at full capacity with chloroform at a solvent to broth ratio of one to two. The chloroform solution was washed with a sodium bicarbonate buffer at pH 9.0. It was concentrated to 250 mg. of product per ml. of solution. To the solvent concentrate was added one volume of 1% sodium bicarbonate adjusted to pH 8.5 with sodium hydroxide. The mixture was then cooled to 0° C. and stirred slowly for ten hours. The crystalline product was then filtered. The crystals were dried under vacuum with the application of slight heat. The dried product was then dissolved in a mixture of 90% by volume of ethylene chloride and 10% by volume of ethanol using 50 mg. of the solid per ml. of solvent mixture. The purified product was crystallized by the gradual addition of an equal volume of water using agitation throughout the addition. The crystalline product that separated was filtered and dried.

*Example IV*

A fermentation broth containing 100 mg. of prednisone per gallon was prepared by the action of *Micromonospora chalcea* as described in copending patent application, Serial No. 580,703, filed April 26, 1956. The broth was filtered with the aid of a diatomaceous earth filteraid at pH 4.0. It was then extracted in a model 6080 Podbielniak extractor operating at full capacity against ethylene chloride at a solvent to broth ratio of 1.4 to 1. The ethylene chloride extract was washed with one volume of sodium acetate-sodium hydroxide buffer adjusted to pH 7.5. The washed ethylene chloride solution of the steroid was concentrated by distillation to obtain a solution containing 250 mg. of prednisone per ml. of solution. To the solvent concentrate was added one volume of 1% disodium acid phosphate adjusted to pH 7.5 with sodium hydroxide. The mixture was then cooled to 10° C. and stirred for twenty hours. The crystalline product was then filtered. The crystals were dried under vacuum with the application of slight heat. The dried product was then dissolved in a mixture of methylene chloride and alcohol and precipitated by the gradual addition of water using agitation throughout the addition.

*Example V*

A fermentation broth prepared by the growth of *Curvularia lunata* in a fermentation medium as described in U.S. Patent 2,658,023 and containing approximately 200 mg. of hydrocortisone per gallon of broth together with other steroid impurities was filtered at pH 4. The product was then extracted with methylethyl ketone in a model 7500 Podbielniak extractor operating at full capacity and at a solvent to broth ratio of 1 to 3. The methylethyl ketone was then washed with sodium acid phosphate buffer at pH 8. The methylethyl ketone solution was then concentrated to 250 mg. of product per mg. of solution. Three volumes of ethylene chloride were added and a volume of methanol equivalent to one-fifth that of the ethylene chloride. To the mixture was added gradually 1% solution of disodium acid phosphate at a pH of 8.5 until crystallization of the product was complete. The mixture was stirred throughout the addition and for several hours thereafter. The product was filtered, washed with a small volume of solvent mixture and dried.

*Example VI*

A fermentation broth containing 100 mg. of prednisone per gallon was prepared by the action of *Micromonospora chalcea* as described in copending patent application No.

580,703, filed April 26, 1956. The broth was filtered with the aid of a diatomaceous earth filteraid at pH 4.0. It was then extracted in a model 6900 Podbielniak extractor operating at full capacity against methylene chloride at a solvent to broth ratio of 1.4 to 1. The methylene chloride extract was washed with one volume of sodium acetate-sodium hydroxide buffer adjusted to pH 7.5. The washed methylene chloride solution of the steroid was concentrated by distillation to obtain a solution containing 250 mg. of prednisone per ml. of solution. To the solvent concentrate was added one volume of 1% disodium acid phosphate adjusted to pH 7.5 with sodium hydroxide. The mixture was then cooled to 10° C. and stirred for twenty hours. The crystalline product was filtered and the crystals were dried under vacuum with the application of slight heat. The dried product was then dissolved in a mixture of methylene chloride and alcohol and precipitated by the gradual addition of water using agitation throughout the addition.

What is claimed is:

1. A process for the recovery of 3-keto steroids of the pregnane series from fermentation broths wherein they are produced which comprises filtering the mycelium, extracting the steroid into a water-immiscible organic solvent chosen from the group consisting of methyl ethyl ketone, methyl isobutyl ketone, methylene chloride, ethylene chloride and chloroform, washing the resulting extract with at least one-third volume of an aqueous solution of a buffer adjusted to a pH of from 7.5 to 9.0, separating said buffer solution, concentrating the buffer washed solvent extract, adding thereto at least one-half volume of an aqueous solution of a buffer adjusted to a pH of from 7.5 to 9.0, cooling to a temperature not less than about 0° C., stirring the mixture for several hours, and separating the crystalline steroid compound.

2. A process as in claim 1 wherein the buffer washed ketone solution of steroid is concentrated and taken up in a halogenated solvent selected from the group consisting of methylene chloride, ethylene chloride and chloroform, together with a minor proportion of a lower alkanol containing up to three carbon atoms prior to the second treatment with buffer solution.

3. A process as in claim 1 wherein the buffer washed halogenated solution of steroid is treated with between about 5 and 35% of a lower alkanol containing up to three carbon atoms prior to the second treatment with buffer solution.

4. A process as in claim 1 wherein the buffer solution is an aqueous solution of sodium acid phosphate and sodium hydroxide adjusted to a pH of about 8.5.

5. A process as in claim 1 wherein the crystalline steroid compound is recrystallized by the addition of water to a solution of said steroid compound in a solvent system comprising a lower alkanol containing up to three carbon atoms and a water-immiscible halogenated organic solvent selected from the group consisting of methylene chloride, ethylene chloride and chloroform.

6. A process as in claim 5 wherein the water-immiscible halogenated solvent is chloroform and the lower alkanol is methanol.

References Cited in the file of this patent
UNITED STATES PATENTS
2,695,260    Murray _____ Nov. 23, 1954